United States Patent Office 3,525,703
Patented Aug. 25, 1970

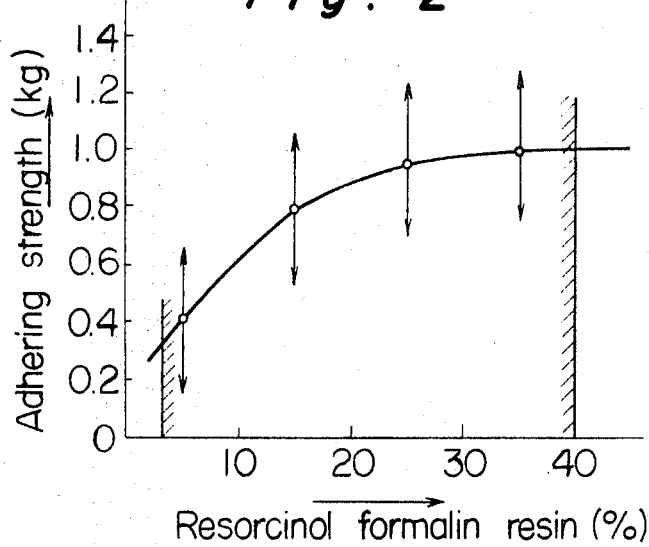
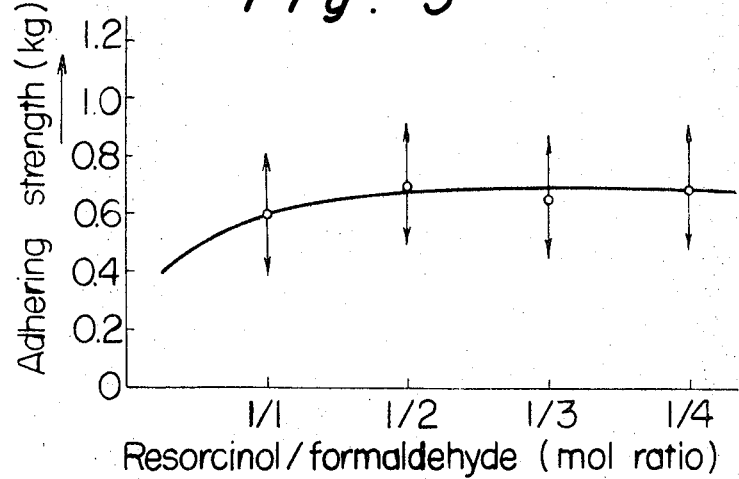

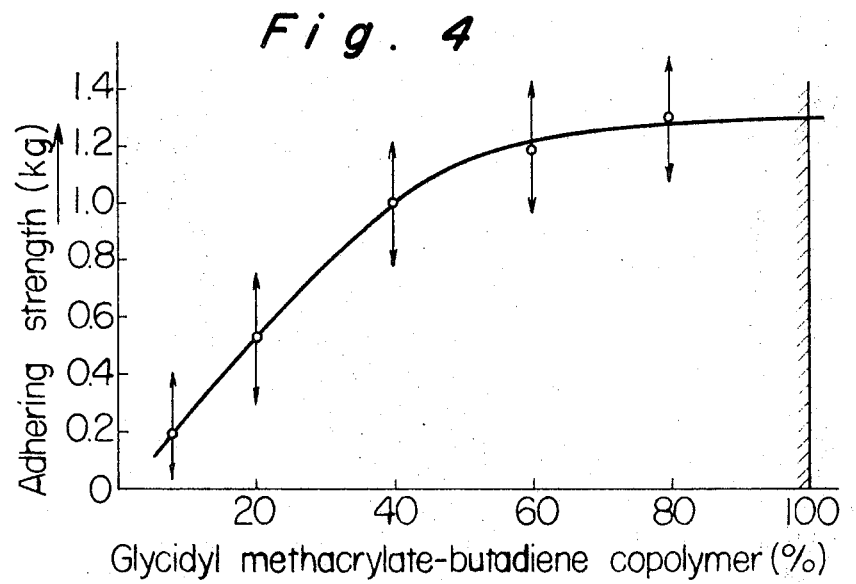
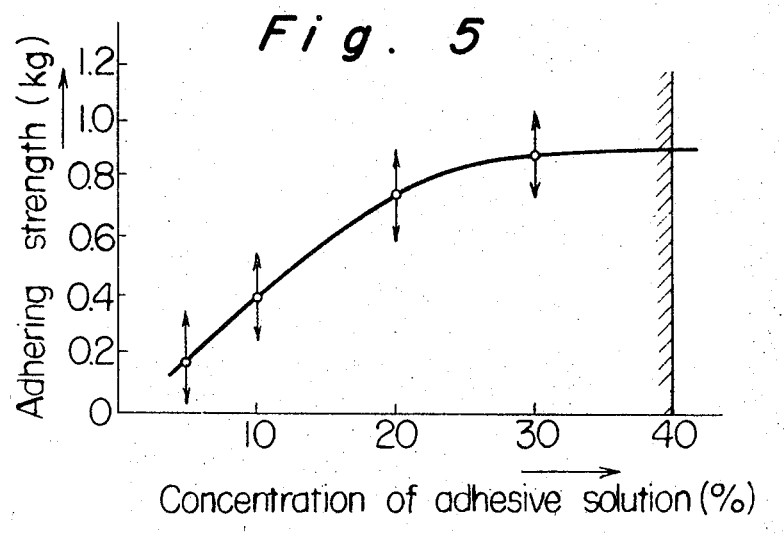

3,525,703
METHOD OF ADHERING A SYNTHETIC FIBRE TO A RUBBER, AN ADHESIVE SOLUTION AND A LAMINATE OBTAINED BY IMPROVING A METHOD OF ADHERING A SYNTHETIC FIBRE TO A RUBBER
Ichiro Iwami and Toshio Honda, Kodaira, Tokyo, Japan, assignors to Bridgestone Tire Company Limited, Tokyo, Japan
Filed Aug. 22, 1966, Ser. No. 574,012
Int. Cl. G08g 51/24, 45/08
U.S. Cl. 260—5                4 Claims

ABSTRACT OF THE DISCLOSURE

A water-base adhesive composition for bonding synthetic fiber material to rubber includes a solids content of 1 to 40% by weight of a mixture of a thermosetting resorcinol-formaldehyde resin, a high polymer epoxy resin latex and a rubber latex. Preferably the mixture contains 5 to 15% of resorcinol-formaldehyde resin, 20 to 35% of high polymer latex containing epoxy groups, and 50 to 70% of rubber latex. For bonding polyethylene-terephthalate tire cord to rubber in manufacturing tires, a suitable composition includes 27.1 parts of a sodium hydroxide-catalyzed resorcinol-formaldehyde resin (27.1:36.5), 187 parts styrene-butadiene copolymer latex, 177 parts vinyl-pyridine-styrene-butadiene copolymer latex and 102 parts of glycidyl methacrylate-butadiene copolymer latex (20:80), all parts by weight.

---

The present invention relates to adhesion of a synthetic fibre to a rubber, more particularly, adhesion of a polyester fibre to a rubber and an improved laminate obtained by improving a method of adhering a synthetic fibre to a rubber.

The term "synthetic fibre" used herein includes polyamides, polyvinyl alcohols and rayon fibres as well as polyester fibres.

The term "polyester fibre" used herein means a fibre consisting of linear high polyester which contains ester linkage in the main chain and is orientated highly in direction of fibre axis, for example, products obtained by reacting glycols, such as, ethylene glycol, propylene glycol, methoxy polyethylene glycol, pentaerythritol and etc. with carboxylic acids, such as terephthalic acid, p-hydroxybenzoic acid and etc. The most typical fibre is polyethylene terephthalate fibre.

The term "fibre material" used herein means reinforcing materials to be used for reinforcing rubber articles, such as air tire, belt, air spring, and rubber hose and is used in the form of filament yarn, cord, cable, cord fabric and canvas.

In the production of the above described articles, a laminate of a fibre and a rubber is used.

The term "rubber" used herein means ones generally referred to as rubbery elastic polymers including natural rubber and synthetic rubber, and includes a rubber of a blend of more than two rubbers selected from the group consisting of generally used rubbers, such as, natural rubber, styrene-butadiene copolymer rubber, butadiene-acrylonitrile copolymer rubber, polybutadiene rubber, polyisoprene rubber, isoprene-isobutylene copolymer rubber, polychloroprene rubber and etc.

When reinforcing rubber articles with fibre materials, a sufficient adhesive between rubber and fibre material is required to endure a large periodic deformation to which the rubber articles are subjected in use.

The polyester fibre has a high tensile strength, a high modulus and excellent heat and water resistances, and is one of the ideal fibres for reinforcing rubber, but said fibre is adhered to the other material with difficulty, so that isocyanate compounds have previously been used as an adhesive to rubber.

In a commercial scale, it is preferable to use water as a medium of the adhesive. By reason of this in order to prevent reaction of isocyanate with water, the isocyanate group of isocyanate compound is once blocked with such a phenolic compound that combines with the isocyanate group at room temperature and dissociates the isocyanate group at an elevated temperature, and then such a blocked isocyanate compound is methylolized by formaldehyde, and the methylolized blocked isocyanate compound is dispersed in water and on the body to be adhered is heated at a temperature more than about 140° C. to regenerate the isocyanate group. Such a process of solubilization in water by the methylolization of blocked isocyanate is very troublesome and is not easy to obtain a water base adhesive solution having a constant quality. When rubber articles are reinforced with a polyester fibre material, it is preferable to treat the polyester fibre material with an adhesive solution before embedding polyester fibre material into a unvulcanized rubber compound and vulcanizing the rubber compound in order to adhere the polyester fibre material to the rubber compound.

The object of the present invention is to provide a method for adhering a polyester fibre material to a rubber considerably tight, a water base adhesive solution therefore and a laminate of polyester fibre and a rubber obtained by improving a method of adhering a polyester fibre material to a rubber.

The essential feature of the invention consists in a process for adhering a polyester fibre material to a rubber, in which process the material is treated with an adhesive solution obtained by adding a high polymer latex containing epoxy groups and a rubber latex to a water base solution consisting mainly of resorcinol formaldehyde resin.

Such a process is the base of the present invention, but the methods modified as hereinafter described are included in the scope of the invention. Thus, the invention includes addition of various additives, addition of steps of treatment with an adhesive and kneading an adhesion improving agent into a rubber compound to be adhered.

Additives capable of increasing the strength of adhesive bond (hereinafter abridged as the adhering strength) by adding to the adhesive solution composed of the above described resorcinol formaldehyde resin, a high polymer containing epoxy groups and a rubber latex as the fundamental composition includes low molecular weight epoxy compounds and compounds referred to as adhesive "assistant" in this application selected from the group consisting of various aromatic acid esters, dibasic aliphatic esters, phosphoric acid esters, glycerine derivatives, glycol derivatives, biphenyl derivatives and pentaerythritol derivatives, which promote the diffusion of the above described adhesives into the filament of fibre material. It is possible to select one or more additives from these additives.

Furthermore, in order to increase further the adhering strength, it is possible to add an additional step of treatment to the above said treating process in which the polyester fibre material treated with the above described adhesive solution is dipped again in a rubber latex solution containing resorcinol formaldehyde resin and the dipped fibre material is dried and then the resulting fibre material is embedded in a unvulcanized rubber compound, after which said rubber compound is vulcanized.

Moreover, the invention involves the following process, in which in order to increase and stabilize further the adhering strength, the rubber compound to be adhered is kneaded with cashew resin as an adhesion improving agent to prepare the rubber compound denatured by cashew resin and said rubber compound denatured by cashew resin is adhered to the polyester fibre material treated with the above described adhesive solution.

Resorcinol formaldehyde resin which is one of the thermosetting phenol aldehyde resins, is preferable, but the other thermosetting phenol aldehyde resins can also be used. For example, phenols which can be used as the resin component include phenol, o-cresol, m-cresol, 2,3-xylenol, 2,4-xylenol, 2,5-xylenol, 2,6-xylenol, 3,4-xylenol, 3,5-xylenol, o-ethylphenol, p-t-butylphenol, p-t-acylphenol, bisphenol A, chlorophenol, catechol, phloroglucinol, orcinol and hydroquinone etc. As aldehyde, formaldehyde, paraformaldehyde, hexamethylenetetramine, furfural, salicylaldehyde, benzaldehyde and acrolein etc. may be used. However, in the present invention the most preferable thermosetting phenol aldehyde resin is resorcinol formaldehyde resin. Catalysts for producing such resins include potassium hydroxide, sodium hydroxide, ammonium hydroxide, monomethylamine, monoethylamine, piperidine, piperazine and triethanol amine. These catalysts can be used alone or in combination. Moreover, in the present invention ammonia resorcinol formaldehyde resin explained hereinafter is the most preferable in view of the quality and easiness of the production.

Here the ammonia resorcinol formaldehyde resin to be used is specifically defined in the invention as the resin derived by reacting resorcinol with formaldehyde in the presence of ammonium hydroxide catalyst.

The ethylenically unsaturated epoxy compound to be preferably used is selected from the group consisting of glycidyl methacrylate, glycidyl acrylate, allyl glycidyl ether, vinyl cyclohexene monooxide, itaconic acid glycidyl ester, etc.

The ethylenically unsaturated compound to be preferably used is selected from the group consisting of styrene, acrylonitrile, acrylic acid, methacrylic acid, vinyl acetate, alkyl acrylate, alkyl methacrylate, chloroacrylate, methyl vinyl ketone, ethylene, propylene, vinyl pyridine, vinyl furan, vinyl chloride, vinylidene chloride, etc. Among these polymers, emulsion copolymer of glycidyl methacrylate with butadiene and emulsion terpolymer of glycidyl methacrylate with butadiene and styrene are most preferable. In the former case, the mole ratio of the copolymerization can be widely ranged from 5:95 to 80:20. The molecular weight of the high polymers having epoxy groups is preferably at least 8,000 and the epoxy equivalent weight of said polymer is preferably less than 3,000, more preferably less than 800.

The rubber latex involves natural Hevea latex, natural rubber latices grafted with vinyl compounds such as methyl methacrylate, vinylpyridine and etc. and various synthetic rubber latices. Synthetic rubber latices include homopolymer latex of a conjugated diene compound selected from the group consisting of isoprene, butadiene and chloroprene, and copolymer latices obtained by the copolymerization of butadiene and one or two of vinyl monomer selected from the group consisting of styrene, vinylpyridine, acrylonitrile, acrylic acid, methacrylic acid, alkyl acrylates and alkyl methacrylates.

For example, mention may be made of styrene-butadiene coplymer rubber latex, vinylpyridine-styrene-butadiene copolymer rubber latex, polybutadiene rubber latex, polyisoprene rubber latex, polychloroprene rubber latex, isoprene-isobutylene copolymer rubber latex, butadiene-acrylonitrile copolymer rubber latex, butadiene-methacrylic acid copolymer rubber latex, butadiene-acrylonitrile-methacrylic acid copolymer rubber latex, butadiene acrylonitrile-acrylic acid copolymer rubber latex, butadiene-styrene-methacrylic acid copolymer rubber latex, butadiene-styrene-acrylic acid copolymer rubber latex.

Among these latices, one or more latices can be selected.

In order to increase the stability of the latex, alkaline substances such as sodium hydroxide or potassium hydroxide may be added in a suitable amount and this does not cause any inconvenience in the present invention.

The term "low molecular weight epoxy compounds" used herein means epoxides having a molecular weight of less than 3,000, preferably less than 1,500, having epoxy equivalent weight of less than 800, preferably less than 500 and having more than two epoxy groups per one molecule, for example, reaction products of a polyhydric alcohol such as glycerol, propylene glycol, ethylene glycol, butylene glycol, hexanetriol, sorbitol, mannitol, pentaerythritol, polyvinyl alcohol, tris(2-hydroxyethyl)isocyanurate and a polybutadiene of a low polymerization degree having end hydroxyl group, and halogen-containing epoxides such as epichlorohydrine; reaction products of a polyhydric phenol such as resorcinol, hydroquinone, pyrocatechol, 1,3,5-trihydroxybenzene, bis(4 - hydroxyphenyl)dimethylmethane, bis(4 - hydroxyphenyl)methane, tetra(4 - hydroxyphenol)ethane, trihydroxybis phenyl, 1,5 - dihydroxynaphthalene, cardanol, cardol, dihydroxyphenyl sulfone, 2,2,5,5 - tetrakis(4-hydroxyphenyl)hexane, phenol-formaldehyde resin, resorcinol formaldehyde resin and etc. and the above mentioned halogen-containing epoxides; epoxy compounds obtained by oxidation of the unsaturated bond of an unsaturated organic compound with peracetic acid, hydrogen peroxide and etc., that is, glycidyl ether, butyl glycidyl ether, octylene oxide, vinylcyclohexane, diepoxide, 3,4-epoxy-6-methylcyclohexylmethyl - 3,4-epoxy-6-methylcyclohexene carboxylate, 3,4 - epoxycyclohexylmethyl - 3,4-epoxycyclohexene carboxylate, 2,6 - diglycidylphenyl glycidyl ether, epoxy polybutadiene having a low polymerization degree, epoxy styrene-butadiene copolymer having a low polymerization degree, epoxy nitrile rubber having a low polymerization degree and etc.

Furthermore, as the low molecular weight epoxy compounds use may be made of triglycidyl cyanurate, triglycidylisocyanurate, N,N - bis(2,3-epoxypropyl)piperazine, diglycidylferrocene, p-aminophenolglycidyl ether glycidyl ester, diglycidyl stearylamine, 1,3,5 - tris-3-(2,3-epoxypropoxy)propionylperhydro - S - triazine, diphenolic acid glycidyl ester ether, tris(2,3-epoxypropoxy)ethyl cyanurate and etc.

The epoxy compounds, which are insoluble in water are usually employed as an emulsion or a colloidal dispersion.

Considering based on the results of the investigations obtained, the mechanism of the adhesion according to the invention may be as follows:

Presumably, the function of resorcinol formaldehyde resin consists in the fact that it presents oxidation to which a component of the adhesive solution, particularly, the rubber latex is subjected in drying step after treatment with the adhesive solution because resorcinol formaldehyde resin is the radical acceptor of radical reaction in the oxidation step of rubber latex solids, and thus the affinity of the adhesive for the rubber compound to be adhered is not affected adversely.

Since heated orthochlorophenol, methacresol and resorcinol are good solvent for linear polyester, it is conceived that resorcinol nucleus has a remarkably high affinity for polyester.

Furthermore, it has been well known that phenolic hydroxyl group and active methylol group in resorcinol formaldehyde resin form a chemical bond with double bond of rubbery polymer.

The reason why ammonia resorcinol formaldehyde resin is most preferable among resorcinol formaldehyde resins is considered as follows:

When ammonia water is added dropwise to an aqueous solution of resorcinol and formalin, the resinification proceeds rapidly to form ammonia resorcinol formaldehyde resin having an extremely complicated structure. It is apparent from the description in "Kogyo Kagaku Zasshi (1929)" Vol. 32, page 700 by T. Shoya that in this case, ammonia not only acts as a catalyst for the resinification, but also forms a constituent unit of resin.

As the constituent unit of ammonia resorcinol formaldehyde resin, for example, the following configurations:

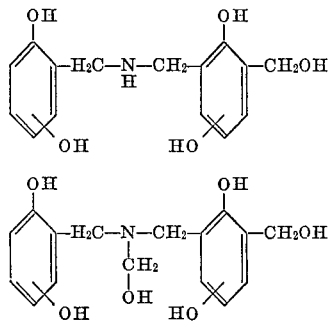

can be considered, so that a reaction of the compound having the above formulae with epoxy compounds and function of said compound as hardening accelerator of epoxy resin can easily be understood. Furthermore, a bond with polyester fibre surface due to ammonolysis can also be considered,

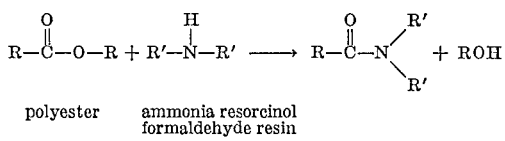

polyester     ammonia resorcinol
              formaldehyde resin

An adhesive solution used an epoxy compound together with an aliphatic amine or an aromatic amine has been previously used for an adhesion of a polyester and a rubber, but such amines are harmful and have a strong function to coagulate the adhesive solution, so that such an adhesive solution is not preferable.

Thus, it can be understood that the ammonia resorcinol formaldehyde resin has function to connect the polyester, the rubber and the epoxy compound tightly.

The rubber latex provides a useful property to the treated fibre. The rubber latex component is one having the highest affinity for rubber compound to be adhered, so that it improves the adhering strength for the rubber. Furthermore, the rubber latex provides flexibility to the treated fibre material to improve fatigue resistance of the fibre material and improves the workability of the fibre material.

The high polymer having epoxy groups makes film of the adhesive formed on the fibre remarkably tough and adds the mechanical adhesion for the fibre material to the adhesive and moreover prevents decrease of adhesion resulting from cohesion breakage of the adhesive, so that the adhering strength is remarkably increased.

If the solution composed of the resorcinol formaldehyde resin, the high polymer containing epoxy groups and the rubber latex is added with the above described low molecular weight epoxy compound, the adhesion is further enhanced. Presumably, this is based on the fact that since the low molecular weight epoxy compound has a low molecular weight, it is penetrated and diffused easily into fine structure of the fibre material and has a remarkable function to connect the resorcinol formaldehyde resin with the fibre material tightly.

According to the method of the invention, the fibre material dipped in the adhesive solution is taken out from the adhesive solution in such a state that the surface of the fibre material is covered around with an appropriate amount of the adhesive solution containing 1 to 10 parts of solids per 100 parts of the fibre material and then is preferably exposed at least one time in an atmosphere maintaining a given constant temperature of from 200° C. to 250° C. in order to dry or heat treat it. Furthermore, it can be dried preliminarily at a temperature less than 200° C. before this step. Thus, on the surface of fibre material the solid film layer of dried components of said adhesive solution is built up. In order to make the bond between the components of the adhesive solution and the fibre sufficiently tight, it is preferable to elevate the temperature of the atmosphere within the range wherein the physical property of the fibre material is not decreased. When the atmosphere is composed of air, conventional rubber latex adhesives are oxidized considerably by oxygen in air, an affinity for a rubber compound does not longer exist, but according to the invention this tendency is prevented by the antioxidant function of the resorcinol formaldehyde resin, so that the adhesion to the rubber compound is excellent.

For a better understanding of the invention, reference is taken to the accompanying drawings:

FIG. 2 is a graph showing a relation of an amount of resorcinol formaldehyde resin and the adhering strength;

FIG. 3 is a graph showing a relation of mole ratio of formaldehyde to resorcinol and the adhering strength;

FIG. 4 is a graph showing a relation of an amount of glycidyl methacrylate-butadiene copolymer and the adhering strength; and FIG. 5 is a graph showing a relation of concentration of the adhesive solution and the adhering strength.

Figure 1:
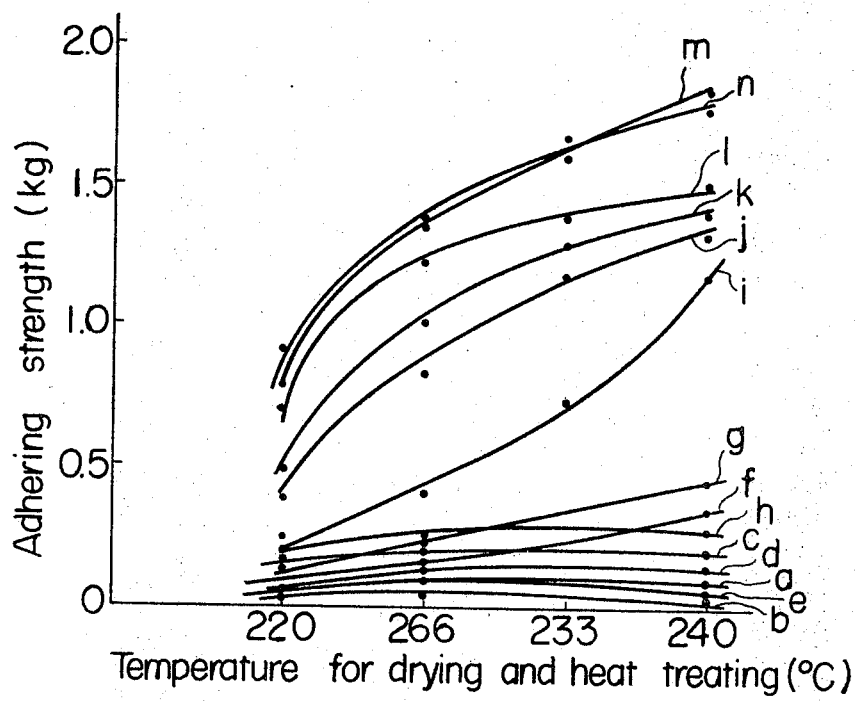
FIG. 1 is a graph showing comparison of the adhering strength according to the adhering method of the invention with that of the other adhering methods.

Referring to the drawings, FIG. 1 shows the adhering strength when 1,100 d./2 of polyethylene terephthalate tire cord dipped in various following described water base adhesive solutions ($a, \ldots n$) controlled the concentration to 20% are dried and heat treated at various temperatures for two minutes. The adhering strength expressed by power necessary to peel the cord at a rate of 30 cm./min. before which the treated cord is embedded near the surface of a sheet of unvulcanized rubber compound having a thickness of 2 mm. and then the rubber compound is vulcanized.

In general, the higher the temperature for drying and heat treating the dipped tire cords, the higher the adhering strength.

In FIG. 1 references $a$ to $n$ represent the following means:

($a$) A solution of resorcinol formaldehyde resin (hereinafter abridged as RF) used a catalyst of sodium hydroxide.

($b$) An emulsion of epoxy novolak resin (trade name, DEN438, made by Dow Cehmical Co.) as one example of the low molecular weight epoxy compound.

($c$) A solution of glycidyl methacrylate-butadiene copolymer rubber latex (copolymerization ratio: 30:70).

($d$) A solution of vinylpyridine-styrene-butadiene copolymer rubber latex (trade name, JSR0650, made by Nippon Gosei Gomu K.K.).

($e$) An adhesive solution composed of 50 parts of RF and 50 parts of DEN438 (calculated on solids and so forth).

($f$) An adhesive solution composed of 20 parts of RF and 100 parts of JSR0650.

($g$) An adhesive solution composed of 15 parts of RF, 100 parts of JSR0650 and 15 parts of DEN438.

($h$) An adhesive solution composed of 40 parts of glycidyl methacrylate-butadiene copolymer rubber and 60 parts of JSR0650.

($i$) An adhesive solution involved in the present invention as one example and composed of 40 parts of glycidyl methacrylate-butadiene copolymer rubber, 60 parts of JSR0650 and 20 parts of RF.

($j$) An adhesive solution involved in the present invention as another example and composed of 40 parts of glycidyl methacrylate-butadiene copolymer rubber latex, 60 parts of JSR0650, 15 parts of RF and 15 parts of DEN438.

($k$) An adhesive solution involved in the invention as a further example and composed of 40 parts of glycidyl methacrylate-butadiene copolymer rubber latex, 60 parts of JSR0650, 15 parts of ammonia resorcinol formaldehyde resin and 15 parts of DEN438.

(*l*) An adhesive solution obtained by adding dimethyl phthalate as adhesive assistant to the adhesive solution *k*.

(*m*) The first bath is same as the adhesive solution *l* and the second bath is RFL.

(*n*) An adhesive solution is the same as *l*, provided that the rubber compound for tire carcass to be adhered is the rubber compound denatured by Cashew resin (*l, m, n* are properly illustrated in the following).

Polyester tire cord was treated with the above described adhesive solutions and the treated cord was adhered to rubber compound for tire carcass based on a blend of natural rubber and styrene-butadiene copolymer rubber and the determined adhering strength was shown in FIG. 1 of the accompanying drawings.

As shown in FIG. 1, it can apparently be understood that the above described components cooperate each other to yield an enhanced adhering strength. In the methods other than the present invention, such a high adhering strength can not be obtained.

Furthermore, the effect of addition of the low molecular weight epoxy compound can be fully understood by comparing curve *j* with *i*.

The effect obtained by reacting ammonia with resorcinol and formaldehyde can be fully understood by comparing curve *k* with *j*.

FIGS. 2 to 5 show the adhering strength, wherein 1,100 d./2 of polyethylene terephthalate tire cord is dipped in the adhesive solution consisting of ammonia resorcinol formaldehyde resin, glycidyl methacrylate-butadiene copolymer latex (copolymerization ratio: 30:70) as the high polymer latex containing epoxy groups and JSR0650 as the rubber latex and then the dipped cord is heat treated for 2 minutes at 235° C., after which the tire cord thus treated is adhered to the above described rubber compound.

FIG. 2 is a curve showing a relation of the content of ammonia resorcinol formaldehyde and the adhering strength, that is, the main effect of said resin and from this curve it is seen that as the amount of resin increases, the adhering strength is increased. The experiment is made by factorial experiment and as the result of the statistical analysis the point estimate of population mean of the adhering strength under each condition is shown by *o* mark and the 95% confidence interval is shown by an arrow mark.

The following FIGS. 3 to 5 follow to FIG. 2.

From FIG. 3, it is seen that dependence of the adhering strength on mole ratio of formaldehyde to resorcinol is not so much.

FIG. 4 shows that glycidyl methacrylate-butadiene copolymer contributes to the adhesion highly.

Furthermore, if the concentration of the adhesive solution is higher, the adhering strength is better as shown in FIG. 5.

In the illustration mentioned hereinafter, percent means by weight.

According to the invention, the mole ratio of resorcinol to formaldehyde of resorcinol formaldehyde resin to be used in treatment of the fibre material ranges from 1:0.2 to 1:7.0, preferably, from 1:1.0 to 1:3.0, most preferably from 1:1.5 to 1:2.5. When resorcinol and formaldehyde is reacted with ammonia, the amount of ammonia is 0.2 to 1.8 mole per one mole of resorcinol, preferably, 0.4 to 1.2 mole, and the range to be used most preferably and having a high adhering strength is from 0.6 to 0.9 mole. The amount of resorcinol formaldehyde resin is 1% to 35% based on the total solid content of the adhesive solution, preferably, 2.5% to 25%, most preferably, 5% to 15%. In the case of less than 1%, there is no effect of adhesion, while in the case of more than 35%, the stability of the adhesive solution is lowered and the adhesive solution tends to coagulate. The rubber latex is used preferably in an amount of less than 90% of the total solid content of the adhesive solution calculated on the solid contents. The most preferable range is from 50% to 70%. If said amount is less than 10%, the flexibility of the treated fibre is lost and the adhering strength is decreased. If said amount is more than 90%, a tendency to decrease the adhesion occurs. It is preferable for the amount of high polymer latex containing epoxy groups to be 5% to 85% of the total solid contents of the adhesive solution calculated on solid content, more preferably, 15% to 45%, most preferably, 20% to 35%. In the case of less than 5%, the adhering strength is decreased, while in the case of more than 85% the flexibility of the treated fibre is generally lost. However, it is possible to determine the optimum amount of said high polymer used by preliminary experiment depending upon the high polymer to be used. When adding the low molecular weight epoxy compound, it is preferable for the amount to be 1% to 35% of the total solid content of the adhesive solution, most preferably, 10% to 22%. In the case of less than 1%, there is few effect for the adhesion, while even if an amount of more than 35% is used, any commercial advantage can not be obtained.

In order to make the present invention more effective, the following means can be adopted.

In general, polyester fibre, as seen from the structure and constituent, has little functional group to contribute to the adhesion in the molecule and the fine structure of said fibre is compact, so that the said fibre is dyed with very difficulty and the adhesion is difficult.

Accordingly, it is a means for the adhering strength to increase that the structure is loosed to diffuse the adhesive sufficiently into the fibre. Accordingly, the following processes are adopted wherein in order to improve the quality of fibre the orientation of amorphous region is disturbed by cocondensation of the fibre with isophthalic acid, oxybenzoic acid or pentaerythritol or wherein any group having affinity for the adhesive is introduced into polymer.

The method of the invention provides a more efficient method for diffusing the adhesive into polyester fibre including above mentioned improved film. Thus, the diffusion of the adhesive into the fibre becomes easy by addition of an adhesive assistant as described hereinafter to the above described adhesive solution, so that the adhering strength is increased.

The "adhesive assistant" includes the following compounds as shown in (1) to (8).

(1) Aromatic acid esters having the following general Formulae I and II

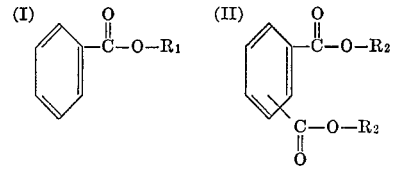

wherein $R_1$ and $R_2$ represent hydrocarbon radicals having less than 16 carbon atoms, hydrocarbon radicals having less than 16 carbon atoms and containing ether linkage or ester linkage, or halogenated hydrocarbons having less than 16 carbon atoms. Said hydrocarbon radicals involve radicals consisting of aliphatic compounds, alicyclic compounds and aromatic compounds.

Such aromatic acid esters include dimethyl phthalate, diethyl phthalate, dipropyl phthalate, dibutyl phthalate, diisobutyl phthalate, diacyl phthalate, di-n-hexyl phthalate, dibenzyl phthalate, di-2-ethylhexyl phthalate, di-n-octyl phthalate, diisooctyl phthalate, dicapryl phthalate, octyl capryl phthalate, nonyl phthalate, diisodecyl phthalate, didodecyl phthalate, dicyclohexyl phthalate, dibutoxyethyl phthalate, bis(diethyleneglycolmonoethyl ether) phthalate, ethylphthalyl ethyl glycolate, methylphthalyl ethyl glycolate, butylphthalyl butyl glycoate, bis-2-fluorophenl phthalate, bis-4-chlorophenyl phthalate, bis-2,4-dichlorophenyl phthalate, bis-2,4,6-trichlorophenyl phthalate and etc.

In the above mentioned esters, as the acid component mention was made of phthalic acid, but instead of phthalic acid, benzoic acid, isophthalic acid and terephthalic acid can be used as the acid components.

(2) Dibasic saturated and unsaturated fatty acid esters having the following general Formula III (III) $\quad R_1-O-\overset{O}{\underset{\|}{C}}-R_5-\overset{O}{\underset{\|}{C}}-O-R_2$ wherein $R_5$ represents saturated or unsaturated aliphatic hydrocarbon radicals having 2 to 10 carbon atoms, $R_1$ and $R_2$ represent hydrocarbon radicals having less than 16 carbon atoms, hydrocarbon radicals having less than 16 carbon atoms and containing ether linkage or ester linkage, or halogenated hydrocarbon radicals having less than 16 carbon atoms.

Such esters, for example, include dimethyl maleate, diethyl maleate, dibutyl maleate, dioctyl maleate, dinonyl maleate, dimethyl furmarate, diethyl fumarate, dibutyl fumarate, dioctyl fumarate, dinonyl fumarate, diethyl adipate, diisobutyl adipate, di-n-hexyl adipate, diisooctyl adipate, dinonyl adipate, di-3,5-dimethylhexyl adipate, dimethoxyethyl adipate, diethoxyethyl adipate, dihexyl azelate, dioctyl azelate, dimethyl sebacate, diethyl sebacate, dihexyl sebacate, dioctyl sebacate, dicapryl sebacate, dibutoxyethyl sebacate, butyl benzyl sebacate, capryl benzyl sebacate, dibenzyl sebacate, di-2-chloroethyl sebacate and etc.

(3) Phosphoric acid esters having the following general Formula IV (IV)
$$R_1-O-\underset{\underset{O}{\|}}{\overset{\overset{R_2}{|}}{\underset{|}{P}}}-O-R_3$$

wherein $R_1$, $R_2$ and $R_3$ represent hydrocarbon radicals having less than 16 carbon atoms, hydrocarbon radicals having less than 16 carbon atoms and having ether linkage or ester linkage, or halogenated hydrocarbon radicals having less than 16 carbon atoms.

Such esters include triethyl phosphate, tributyl phosphate, tri-2-ethylhexyl phosphate, tributoxyethyl phosphate, triphenyl phosphate, cresyl diphenyl phosphate, tricresyl phosphate, tridimethylphenyl phosphate, diphenyl-mono-o-xenyl phosphate, tri-p-tert.-butylphenyl phosphate, tri-2-chloroethyl phosphate and etc.

(4) Glycerol and trimethylolpropane derivatives having the following general Formulae V and VI (V)
$$\begin{array}{l} H_2C-O-\overset{O}{\underset{\|}{C}}-R_1 \\ H\overset{}{C}-O-\overset{O}{\underset{\|}{C}}-R_2 \\ H_2C-O-\overset{O}{\underset{\|}{C}}-R_3 \end{array}$$

(VI)
$$\begin{array}{l} H_2C-O-\overset{O}{\underset{\|}{C}}-R_2 \\ C_2H_5-\overset{}{C}-CH_2-O-\overset{O}{\underset{\|}{C}}-R_2 \\ H_2C-O-C-R_2 \\ \qquad\|\\ \qquad O \end{array}$$

wherein $R_1$, $R_2$ and $R_3$ have the same meanings as described above.

Such derivatives include glycerol acetate, glycerol tripropionate, glycerol tributyrate, trimethylolpropane triacetate, trimethylolpropane tripropionate, trimethylolpropane tributyrate and etc.

Even if the hexanetriol derivatives which are the isomers, are used instead of trimethylolpropane derivatives in the above examples, the same effect can be expected.

(5) Glycol derivatives having the following general Formula VII (VII) $\quad R_1-\overset{O}{\underset{\|}{C}}-O-(CH_2-CH_2-O)_n-\overset{O}{\underset{\|}{C}}-R_2$ wherein $R_1$ and $R_2$ have the same meanings as described above and $n$ represents an integer of 1 to 10.

Such derivatives include diethylene glycol diacetate, diethylene glycol dipropionate, tetraethylene glycol dibutyrate and etc.

(6) Biphenyl derivatives having the following general Formula VIII (VIII) 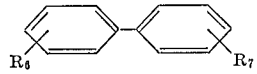

wherein $R_6$ and $R_7$ represent hydrogen atoms, alkyl radicals or alkoxy radicals having less than 5 carbon atoms, nitro radicals or halogen atoms.

Such derivatives, include, for example, biphenyl, amylbiphenyl, diamylbiphenyl, methoxybiphenyl, chlorinated biphenyl and etc.

(7) Pentaerythritol derivatives having the following general Formula IX (IX)
$$R_1-\overset{O}{\underset{\|}{C}}-O-CH_2-\underset{\underset{\overset{|}{CH_2-O-\overset{O}{\underset{\|}{C}}-R_4}}{|}}{\overset{\overset{CH_2-O-\overset{O}{\underset{\|}{C}}-R_2}{|}}{C}}-CH_2-O-\overset{O}{\underset{\|}{C}}-R_2$$

wherein $R_1$, $R_2$ and $R_3$ have the same meanings as described above, and $R_4$ has the same meaning as $R_1$, $R_2$ and $R_3$.

For examples, mention may be made of pentaerythritol tetraacetate, pentaerythritol tetrapropionate, pentaerythritol tetrabutyrate and etc.

When using the above described adhesive assistant, the adhesive assistant is emulsified by a surfactant and then the emulsion is added to the adhesive solution. It is preferable for the amount to be 0.1 to 10.0% based on the total solid contents of the adhesive solution and in the case of less than 2.5%, a sufficient effect can be obtained. The most preferable range is 0.5 to 2.5%. If the effect of the adhesive assistant is again explained with reference to FIG. 1, said effect is shown by curve 1 in FIG. 1. 1 is curve showing the adhering strength when using an adhesive solution obtained by adding 1.0 part of dimethyl terephthalate to the adhesive solution used in $k$. From this figure the contribution of the adhesive assistant to the adhering strength can be seen.

The polyester fibre material treated with the above described adhesive solution is dipped again in a solution of rubber latex containing resorcinol formaldehyde resin and the dipped fibre is dried, whereby an excellent adhering strength can be obtained.

Namely, it is possible to effect the following process, wherein the first bath is composed of the adhesive solution consisting of the resorcinol formaldehyde resin, the rubber latex, the high polymer latex having epoxy groups and a low molecular weight epoxy compound or the adhesive solution obtained by adding the above described adhesive assistant to said four components and then the polyester fibre material is dipped in the first bath and the dipped fibre material is dried and heat treated, after which the heat treated fibre is again dipped in the second bath composed of resorcinol formaldehyde resin and rubber latex and then dipped fibre material is dried and thereafter the dried fibre material is adhered to rubber compound. The effect of such two step adhesion process is illustrated in FIG. 1, and said effect is shown by curve $m$. $m$ is a curve showing the adhering strength when using the adhesive solution used in $l$ as the first bath and the solution composed of resorcinol formaldehyde resin and rubber latex (RFL) as the second bath. From this curve, the effect of said two step treatment can easily be seen.

The temperature for drying the fibre after treatment of the second bath ranges from 110° C. to 230° C.

The resorcinol formaldehyde resin to be used in RFL solution of the second bath is obtained by reacting resorcinol and formaldehyde in mole ratio of 1.02 to 1.7, preferably, 1.1 to 1.25 in the presence of sodium hydroxide or potassium hydroxide in an aqueous solution at room temperature. In this case, pH of the final composition liquid is adjusted to 9.0 to 9.5. For the rubber latex in RFL solution, one or more latex can be selected from the above described rubber latex group depending upon the rubber compound to be adhered. In general, use may be made of natural rubber latex, styrene-butadiene copolymer rubber latex, polybutadiene rubber latex, polyisoprene rubber latex, vinylpyridine-styrene-butadiene copolymer rubber latex and etc. for tire carcass rubber based on natural rubber, styrene-butadiene copolymer rubber, polybutadiene rubber, polyisoprene rubber and etc. It should be noted in such two step adhesion process that the range of selection of the rubber latex in the second bath is limited in a certain degree depending upon the rubber compound to be adhered, but the rubber latex to be used in the first bath can be selected irrespective of the rubber compounds to be adhered. Accordingly, even when tire carcass rubber based on natural rubber is to be adhered as the first bath, use may be made of polychloroprene rubber latex, acrylonitrile-butadiene copolymer rubber latex and etc., so that the adhering strength can be further improved.

Polyester fibre materials treated with the adhesive solutions according to the present invention, can be adhered to rubber compound with a further improved bonding power. In order to adhere the cord thus treated to a rubber compound more tightly, it is necessary to contact the adhesive component formed on the fibre material with the rubber compound in the contact face intimately. This could be solved by a specific means mentioned hereinafter, that is, means wherein the rubber compound is denatured by an adhesion improving agent and the surface of the rubber compound is polarized to a certain degree. When the rubber compound is denatured by the adhesion improving agent in order to improve the adhesion, it is necessary to select such a resin forming component that the properties which the rubber compound has inherently are not damaged. Accordingly, in the present invention, cashew-nut shell derivatives are selected for the denaturant of the rubber compound. Cashew-nut shell liquid taken out from the shell of cashew-nut named "Anacaldicium occidentale L" contains the compounds having the following general formulae in a ratio of 1:9.

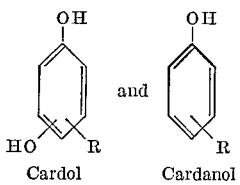

Cardol and Cardanol

It has been known that R is shown by an average rational formula —$C_{15}H_{27}$, and the following four formulae are mixed.

(I) $(CH_2)_{14}CH_3$
(II) $(CH_2)_7$—CH=CH—$(CH_2)_5CH_3$
(III) $(CH_2)_7$—CH=CH—$CH_2CH$=CH$(CH_2)_2CH_3$
(IV) $(CH_2)_7$—CH=CHCH$_2$CH=CHCH$_2$CH=CH$_2$

Cashew nut shell liquid of the main raw material contains cashew nut shell liquid derivatives referred to as cashew resin obtained by self condensation through aldehyde or cocondensation through aldehyde with melamines, ureas, phenols, alkyds and etc. Cashew nut contains a component similar to Japanese lacquor (called "Urushi" in Japan), so that it is used broadly as a coating and it has such a specific feature that oxidation condensation proceeds gradually by natural drying due to the property of the above described side chain of R to harden, which cannot be found in a synthetic phenol resin, so that naturally the classification of the ceshew resin is different from that of synthetic phenol resin.

Cashew resin has the side chain of R, so that it has a high compatibility with rubbers and can be dispersed rapidly and homogeneously into the rubber compound. Furthermore, in the vulcanization step, the linkage between the side chain and rubbers is formed by sulphur or peroxide. Thus even if the rubber compound is denatured by adding the cashew resin to the rubber compound, various properties of the rubber compound are maintained without being deteriorated.

A part of properties of the rubber compounds, when the rubber compound having the following composition is added with resorcinol/hexamethylene tetramine as a comparative example and the cashew resin respectively, are shown in the following table:

| Components: | Parts |
| --- | --- |
| Natural rubber | 60 |
| Styrene-butadiene copolymer rubber | 40 |
| Carbon black | 40 |
| Stearic acid | 2.00 |
| Pine tar | 7.00 |
| Mercapto benzothiazole | 0.30 |
| Dibenzothiazole-sulfide | 1.00 |
| Sulphur | 2.00 |
| Phenyl-naphthylamine | 1.00 |
| Zinc white | 7.00 |

| | Number | | |
| --- | --- | --- | --- |
| | (1) | (2) | (3) |
| | Resorcinol 2.00 parts, hexamethylene tetramine 1.00 part | Cashew resin 5.0 parts (cashew K.K., trade name, cashew #52) | Blank |
| Mooney Scorch time (ML 130° C.), secs. | 362 | 732 | 705 |
| Tensile strength, kg./cm.². | 191 | 193 | 194 |
| 300% modulus, kg./cm.². | 154 | 98 | 104 |
| 500% modulus, (kg./cm.²). | | 186 | 191 |
| Breaking elongation, percent. | 375 | 510 | 502 |

Vulcanization condition: 145° C. x 20 min.

The addition of resorcinol/hexamethylene tetramine brings about decrease of elongation, that is, decrease of limit of elasticity and the shortening of Mooney scorch time. The fact that Mooney scorch time is short means that calender workability is poor and makes laminate of the fibre material with the rubber compound difficult.

On the other hand, in the case of addition of the cashew resin, the properties are not varied as compared with the blank.

If the effect of the denaturalization by the cashew resin for the adhesion is illustrated in FIG. 1, it is shown by the curve $n$ in the figure. $h$ shows curve of the adhering strength when the treated cord is adhered to the above described cashew denatured rubber. In the case $l$ in FIG. 1, that is, when the polyester fibre material treated with the adhesive solution composed of the ammonia resorcinol formaldehyde resin, the epoxy latex, the rubber latex, the low molecular weight epoxy compound and the adhesive assistant is dried and heat treated at a high temperature of from 230° C. to 250° C., the tendency of increase of the adhering strength attending to increase of temperature is somewhat slow, while, when the above treated tire cord is embedded into the rubber compound modified by the cashew resin and the rubber compound is vulcanized, there is no such a slow phenomenon and a highly improved adhesion is obtained as compared with the rubber compound which has not been denatured by the cashew resin.

The amount of the cashew resin to be used for the denaturalization is 0.5 to 20 parts based on 100 parts of rubber content in the rubber compound, preferably, 1 to 10 parts, most preferably, 4 to 7 parts.

Of course, the present invention can be applied to fibre materials consisting mainly of regenerated cellulose, acetate cellulose, polyvinyl alcohol and polyamide containing amide linkage in the main chain. In this case, the temperature for the drying and heat treatment can be selected from the range in which the physical property of each material is not considerably decreased, that is, 140° C. to 250° C.

The laminate of synthetic fibre materials and rubbers to be used for production of various rubber articles can be obtained by laminating a vulcanizable rubber compound on the synthetic fibre material treated as above described by means of conventional calender process.

The invention will be further explained in detail with reference to the following examples.

EXAMPLE 1

Polyethylene terephthalate tire cord having 51 turns/10 cm. of ply twist, 51 turns/10 cm. of cable twist and 1,100 d./2 was dipped in the composition solutions described hereinafter and the dipped tire cord was dried in a drying chamber maintaining at 235° C. The amount of the content of composition solution on tire cord was determined to be 7 parts by weight per 100 parts by weight of tire cord. The tire cord thus treated was embedded in rubber compound for tire carcass and the rubber compound was vulcanized and then when the adhesion property between the cord and the rubber was determined by H test method, the adhering strength exceeded the breaking strength of the cord and in all 16 samples the break occurred at the cord part. The adhering length of cord in rubber was 9 mm. and the breaking strength of a said single treated cord was 13.5 kg. in average. The composition solutions were prepared as follows:

To a solution of 27.1 parts by weight (the part means by weight hereinafter) of resorcinol and 11.4 parts of 36.5% formalin in 415.6 parts of pure water were added 11.7 parts of 10% sodium hydroxide as the catalyst, 187 parts of styrene-butadiene copolymer latex (trade name, JSR2108, made by Nippon Gosei Gomu K.K.), 177 parts of vinylpyrdine-styrene-butadiene copolymer latex (JSR 0650) and 102 parts of glycidyl methacrylate-butadiene copolymer latex (copolymerization ratio: 20:80, concentration: 41%) and the resulting mixture was stirred slowly to obtain a homogeneous solution, after which the solution was left to stand for 4 hours. To the solution 32.2 parts of 28% ammonia water were added and the resulting mixture was left to stand for 16 hours and then the obtained solution was used.

EXAMPLE 2

Polyethylene terephthalate tire cord having 51 turns/ 10 cm. of ply twist, 51 turns/10 cm. of cable twist and 1,100 d./2 was dipped in the composition solution described hereinafter and the dipped tire cord was dried in a dryer maintaining the temperature at 235° C. for 2 minutes. The dry amount of the content of the composition solution deposited on tire cord was determined to find that it was 7 parts per 100 parts of tire cord. Said treated tire cord was embedded in a rubber compound for tire carcass based on natural rubber and the rubber compound was vulcanized and then when the adhering strength was determined by H test, the adhering strength exceeded the breaking strength of cord and the break occurred at the fibre part. The breaking strength of a single cord treated was 13.5 kg., so that, when the cord was embedded near the surface of the rubber and the rubber was vulcanized and then the resulting cord was subjected to the peeling test, the resistance to peeling force was 1.4 per a single cord. The composition solution was prepared as follows.

To a solution containing 27.1 parts of resorcol and 47.4 parts of 36.5 formaldehyde in 415.6 parts of pure water were added 24.0 parts of 28% ammonium hydroxide as the catalyst and were further added 32.6 parts of 10% emulsion of dimethyl phthalate, 187.0 parts of JSR2108, 177.0 parts of JSR0650 and 102.0 parts of glycidyl methacrylate-butadiene copolymer latex (copolymerization ratio: 20:89, concentration: 41%) and the resulting mixture was stirred slowly to obtain a homogeneous solution, after which the solution was aged for 20 hours and then used.

The standard sample treated with a solution having no dimethyl phthalate in the above composition was tested to find that the break occurred at the fibre part as the result of the H test and that the adhering strenght was 1.0 kg. per a single cord as the result of the peeling test.

EXAMPLE 3

The samples obtained in the same manner as described in Example 1 by using the following adhesive assistants instead of dimethyl phthalate used in Example 1, were tested with respect to resistance to peeling forces to obtain the following result.

|   |   | Kg. |
|---|---|---|
| (1) | Benzyl benzoate | 1.3 |
| (1) | Diethyl phthalate | 1.3 |
| (1) | Dibutyl phthalate | 1.3 |
| (1) | Dioctyl phthalate | 1.2 |
| (2) | Dibutyl maleate | 1.1 |
| (2) | Dioctyl sebacate | 1.2 |
| (3) | Tricresyl phosphate | 1.2 |
| (4) | Glycerol triacetate | 1.2 |
| (5) | Diethyleneglycol diacetate | 1.3 |
| (6) | Biphenyl | 1.1 |
| (7) | Benzophenone | 1.1 |
| (8) | Pentaerythritol tetrapropionate | 1.1 |

EXAMPLE 4

A test was made in the same manner as described in Example 1 by using the following composition solution and as the result, the resistance to peeling force was 1.3 kg. per a single cord. The composition solution was prepared as follows:

To a solution of 27.1 parts of resorcinol and 47.4 parts of 36.5% formaldehyde in 415.6 parts of pure water, were added 30.2 parts of 10% sodium hydroxide as the catalyst and were then added 32.6 parts of 10% emulsion of dimethyl phthalate, 187.0 parts of JSR2108, 177.0 parts of JSR0650 and 102.0 parts of glycidyl methacrylate-butadiene copolymer latex (copolymerization ratio: 20.80, concentration: 41% and the resulting mixture was stirred slowly to obtain a homogeneous solution, after which the solution was aged for 20 hours and then used.

The standard sample treated with a solution containing no dimethyl phthalate in said compoistion was tested to find that the resistance to peeling force was 0.95 kg. per a single cord.

EXAMPLE 5

To a solution of 20 parts of resorcinol and 30 parts of 37% formaledhyde in 430 parts of distilled water were added dropwise 28 parts of ammonia water slowly while stirring. Then it was observed that the liquid became white muddy and at the same time the temperature of the liquid was elevated to 35° C. to form ammonia resorcinol formaldehyde resin. The reaction mixture was left to stand for 5 minutes to complete the initial reaction, and then to the mass were added 90 parts of glycidyl methacrylate-butadiene copolymer latex (copolymerization ratio: 30:70) having solid concentration of 40%, 107 parts of 39% JSR2108 and 102 parts of 41% JSR 0650 and the resulting mixture was left to stand for 16 hours and aged to obtain liquid (I).

To 20 parts of epoxy novolak resin (DEN438) were added 10 parts of trichloroethylene and the mixture was formed into a homogeneous solution, and then 1 part of polyoxyethylene-sorbitan monolaurate was added thereto. To the mixture were added slowly 69 parts of water while stirring by a homomixer to obtain a homogeneously emulsified dispersion (II).

Liquids (I) and (II) were mixed in a rate of 14.8 parts of liquid (II) per 100 parts of liquid (I) to obtain an adhesive solution for treating fibre materials. 168.3 parts of rubber composition for tire carcass having the above mentioned composition was kneaded quickly together with 5 parts of cashew resin on the roll of 8 inch in diameter maintained at 70° C. within 5 minutes, to obtain a sheet of unvulcanized rubber denatured by cashew resin.

Polyethylene terephthalate tire cord (1,100 d./2, 51s x 51z T/10 cm.) was dipped in the above mentioned adhesive solution and then the tire cord was taken out from the adhesive solution in the wetted state, after which the tire cord was dried and heat treated for 2 minutes in air atmosphere maintained the temperature at 235° C. As the result of calculation, it was found that 6 parts of the adhesive component per 100 parts of the tire cord were deposited on the surface of the cord. Said treated cord was embedded near the surface of the above mentioned unvulcanized rubber sheet denatured by cashew resin and the rubber compound was vulcanized at 150° C. for 20 minutes under a pressure of 80 kg./cm.². A single cord was peeled from the obtained sample in a rate of 30 cm./min. to obtain average resistance to peeling force of 1.6 kg., which was referred to the adhering strength. The same test was made for a rubber which was not denatured by cashew resin to show 1.2 kg. of adhering strength.

EXAMPLE 6

Glycidyl methacrylate-styrene-butadiene terpolymer latex (polymerization ratio: 10:20:70) was used instead of glycidyl-methacrylate-butadiene copolymer latex in Example 5 to obtain 1.5 kg. of adhering strength.

EXAMPLE 7

Epikote 828 (trade name, made by Shell Chemical Co. Epoxy resin, reaction product of bisphenol A and epichlorohydrine) was used instead of epoxy novolak resin (DEN438) in Example 5 to obtain 1.3 kg. of adhering strength.

EXAMPLE 8

When in Example 5, the temperature for drying and heat treating was 225° C., rubber compound denatured by cashew resin had 1.3 kg. of adhering strength, and undenatured rubber compound had a 1.2 kg. of adhering strength.

EXAMPLE 9

When the adhesive solution in Example 5 was added with 10% emulsion of the following various adhesive assistants, the adhering strengths were as follows:

| | Kg. |
|---|---|
| Dimethyl phthalate | 1.80 |
| Diethyl phthalate | 1.65 |
| Dioctyl sebacate | 1.65 |
| Biphenyl | 1.70 |
| Dibutyl phthalate | 1.65 |
| Benzophenone | 1.75 |

EXAMPLE 10

The adhesive solution used in Example 5 was used as the first bath.

Polyethylene terephthalate tire cord (1,100 d./2, 51s x 51z T/10 cm.) was dipped in the first bath, and then the tire cord was taken out from the first bath in the wetted state, after which the tire cord was dried and heat treated for 2 minutes in air atmosphere maintained the temperature at 235° C. As the result of calculation, it was found that 4 parts of adhesive component per 100 parts of the tire cord were deposited on the surface of the cord.

Then the tire cord treated with the above mentioned first bath was dipped in the second bath of RFL prepared by leaving to stand the composition solution to age for 16 hours, said composition solution having the following recipe:

| | |
|---|---|
| Distilled water | 238.4 |
| Sodium hydroxide | 0.3 |
| Resorcinol | 11.0 |
| 37% formaldehyde | 16.2 |
| 41% vinylpyridine-styrene-butadiene copolymer rubber latex | 244.0 |

Then the thus treated cord was dried and heat treated for 2 minutes in air at 150° C.

Said treated tire cord was embedded near the surface of the above mentioned unvulcanized rubber sheet for tire carcass based on rubber blend of natural rubber and styrene-butadiene copolymer rubber, and then the mass was vulcanized for 20 minutes at 150° C. under a pressure of 80 kg./cm.². When a single cord was peeled from the obtained sample in a rate of 30 cm. per 1 minute, an average adhering strength was 1.6 kg.

EXAMPLE 11

When glycidyl methacrylate-styrene-butadiene terpolymer latex (copolymerization ratio: 10:20:70) was used instead of glycidyl methacrylate-betadiene coploymer rubber latex in Example 10, the adhering strength was 1.4 kg.

EXAMPLE 12

When 12 parts of 10% emulsion of the following various adhesive assistants were added to the first bath in Example 10, the ahering strengths were varied as follows:

| | Kg. |
|---|---|
| Dimethyl phthalate | 1.75 |
| Diethyl phthalate | 1.75 |
| Dioctyl sebacate | 1.65 |
| Biphenyl | 1.70 |
| Dibutyl maleate | 1.80 |

EXAMPLE 13

When 210 parts of styrene-butadiene-methacrylic acid copolymer latex (copolymerization ratio: 25:71.5:3.5) were used instead of 107 parts of JSR2108 and 102 parts of JSR0650 used for the first bath in Example 10, the adhering strength was 1.4 kg. When the latex having copolymerization ratio of 40:56.5:3.5 was used, the adhering strength was 1.85 kg. Moreover, when acrylonitrile-butadiene-methacrylic acid copolymer latex (copolymerization ratio: 40:56.5:3.5) was used, the adhering strength as 1.70 kg. When polychloroprene latex was used, the adhering strength was 1.70 kg.

EXAMPLE 14

When in Example 5, the following tire cord and drying conditions were used, the adhering strengths were as follows:

| Tire cord | Drying condition | Adhering strength, kg. |
|---|---|---|
| 6 nylon tire cord (840 d./2) | 200° C. x 60 sec | 1.8 |
| Polyvinyl alcohol tire cord (1,100 d./2) | 180° C. x 120 sec | 1.4 |
| Rayon tire cord (1,100 d./2) | 170° C. x 60 sec | 1.5 |

What we claim is:

1. A water base adhesive solution for bonding synthetic fiber material to rubber comprising 1 to 35% be weight of a resorcinol resin obtained by the reaction of resorcinol and formaldehyde in the presence of alkaline catalyst selected from the group consisting of potassium hydroxide, sodium hydroxide, monoethylamine, monoethylamine, piperidine, piperazine and triethanol amine, 5 to 85% by weight of a high polymer latex having epoxy groups, a molecular weight of which being more than 8,000 and an epoxy equivalent weight of which being less than 800, selected from the group consisting of polymers obtained by the addition copolymerization of a conjugated diene compound and an ethylenically unsaturated epoxy compound, and polymers obtained by the addition copolymerization of a conjugated diene compound, an ethylenically unsaturated epoxy compound and ethylenically unsaturated compound, 10 to 90% by weight of rubber latex from the group consisting of natural rubber latices, homopolymer latex of isoprene, butadiene or chloroprene, and copolymer latices obtained by the copolymerization of butadiene and one or two of vinyl monomer selected from the group consisting of sytrene, vinylpyridine, acrylonitrile, acrylic acid, methacrylic acid, alkyl acrylates and alkyl methacrylates, and 1 to 35% by weight of a low molecular weight epoxy compound having more than two epoxy groups per molecule, a molecular weight of less than 3,000 and epoxy equivalent weight of less than 500, as composition in mixture ratio of solid contents, mole ratio of resorcinol to formaldehyde in said resorcinol formaldehyde resin being adjusted within the range of from 1:0.2 to 1:7 and the concentration of the total solid contents being 1 to 40% by weight.

2. A water base adhesive solution for bonding synthetic fiber material to rubber comprising 1 to 35% by weight of an ammonia resorcinol formaldehyde resin, obtained by the reaction of resorcinol and formaldehyde in the presence of ammonium hydroxide catalyst, 5 to 85% by weight of a high polymer latex having epoxy groups, a molecular weight of which being more than 8,000 and an epoxy equivalent weight of which being less than 800, selected from the group consisting of polymers obtained by the addition copolymerization of a conjugated diene compound and an ethylenically unsaturated epoxy compound, and polymers obtained by the addition copolymerization of a conjugated diene compound, an ethylenically unsaturated epoxy compound and an ethylenically unsaturated compound, 10 to 90% by weight of a rubber latex from the group consisting of natural rubber latices, homopolymer latex of isoprene, butadiene or chloroprene, and copolymer latices obtained by the copolymerization of butadiene and one or two of vinyl monomer selected from the group consisting of styrene, vinylpyridine, acrylonitrile, acrylic acid, methacrylic acid, alkyl acrylates and alkyl methacrylates, and 1 to 35% by weight of a low molecular epoxy compound having more than two epoxy groups per molecule, a molecular weight of less than 3,000 and an epoxy equivalent weight of less than 500, as composition in mixture ratio of solid contents, mole ratio of resorcinol to formaldehyde in said resorcinol formaldehyde resin being adjusted within the range of from 1:0.2 to 1:7 and the concentration of the total solid contents being 1 to 40% by weight.

3. A water base adhesive solution for bonding synthetic fiber material to rubber comprising 1 to 35% by weight of a resorcinol formaldehyde resin obtained by the reaction of resorcinol and formaldehyde in the presence of alkaline catalyst, selected from the group consisting of potassium hydroxide, sodium hydroxide, monomethylamine, monoethylamine, piperidine, piperazine and triethanol amine, 5 to 85% by weight of a high polymer latex having epoxy groups, a molecular weight of which being more than 8,000 and an epoxy equivalent weight of which being less than 800, selected from the group consisting of polymers obtained by the addition copolymerization of a conjugated diene compound and an ethylenically unsaturated epoxy compound, and polymers obtained by the addition copolymerization of a conjugated diene compound, an ethylenically unsaturated epoxy compound and an ethylenically unsaturated compound, 10 to 90% by weight of a rubber latex from the group consisting of natural rubber latices, homopolymer latex of isoprene, butadiene or chloroprene, and copolymer latices obtained by the copolymerization of butadiene and one or two of vinyl monomer selected from the group consisting of styrene, vinylpyridine, acrylonitrile, acrylic acid, methacrylic acid, alkyl acrylates and alkyl methacrylates, 0.1 to 10% by weight of an adhesive assistant having affinity for the synthetic fiber material to be used, which has the general formula selected from the group consisting of compounds represented by the following formulae:

(I) 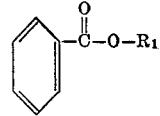

(II) 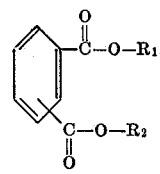

(III) 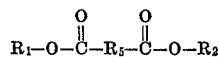

(IV) 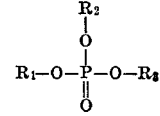

(V) 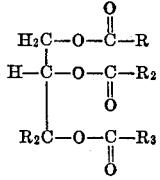

(VI) 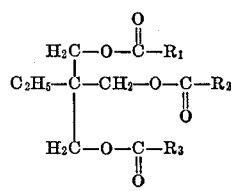

(VII) 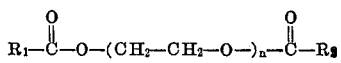

(VIII) 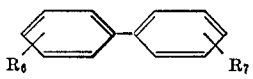

(IX) 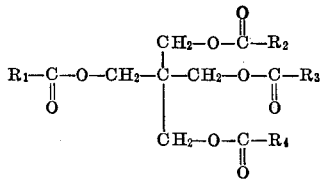

wherein $R_1$, $R_2$, $R_3$ and $R_4$ are radicals selected from the group consisting of hydrocarbon radicals having less than 16 carbon atoms, which contain a linkage selected from the group consisting of ether linkage and ester linkage and halogenated hydrocarbon radicals having less than 16 carbon atoms, $R_5$ is a hydrocarbon radical selected from the group consisting of saturated and unsaturated aliphatic hydrocarbon radicals having 2 to 10 carbon atoms, $R_6$ and $R_7$ are radicals selected from the group consisting of hydrogen atom, alkyl group and alkoxy group having less than 5 carbon atoms, nitro group and halogen atom, $R_8$, $R_9$, $R_{10}$ and $R_{11}$ are radicals selected from the group consisting of hydrogen atom, alkoxy group having less than 3 carbon atoms and halogen atom and $n$ is an integer of 1 to 10, and 1 to 35% by weight of a low molecular weight epoxy compound having more than two epoxy groups per molecule, a molecular weight of less than 3,000 and an epoxy equivalent weight of less than 500, as composition in mixture ratio of solid contents, mole ratio of resorcinol to formaldehyde in said resorcinol formaldehyde resin being adjusted within the range of from 1:0.2 to 1:7 and the concentration of the total solid content being 1 to 40% by weight.

4. A water base adhesive solution for bonding synthetic fiber material to rubber comprising 1 to 35% by weight of an ammonia resorcinol formaldehyde resin, obtained by the reaction of resorcinol and formaldehyde in the presence of ammonium hydroxide catalyst, 5 to 85% by weight of a high polymer latex having epoxy groups, a molecular weight of which being more than 8,000 and an epoxy equivalent weight of which being less than 800, selected from the group consisting of polymers obtained by the addition copolymerization of a conjugated diene compound and an ethylenically unsaturated epoxy compound, and polymers obtained by the addition copolymerization of a conjugate diene compound an ethylenically unsaturated epoxy compound and an ethylenically unsaturated compound, 10 to 90% by weight of a rubber latex from the group consisting of natural rubber latices, homopolymer isoprene, butadiene or chloroprene, and copolymer latices obtained by the copolymerization of butadiene and one or two of vinyl monomer selected from the group consisting of styrene, vinylpyridine, acrylonitrile, acrylic acid, methacrylic acid, alkyl acrylates and alkyl methacrylates, 0.1 to 10% by weight of an adhesive assistant having affinity for the synthetic fiber material to be used, which has the general formula selected from the group consisting of compounds represented by the following formulae:

(I) 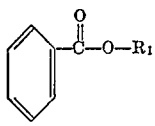

(II) 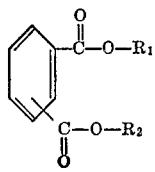

(III) 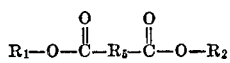

(IV) 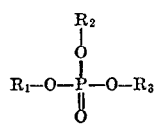

(V) 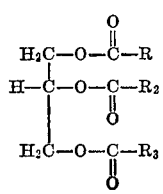

(VI) 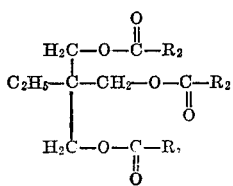

(VII) 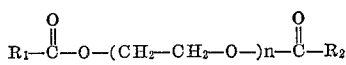

(VIII) 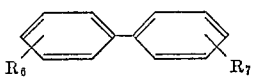

(IX) 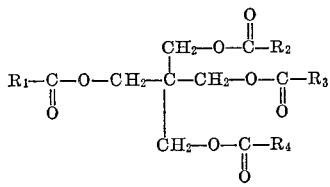

wherein $R_1$, $R_2$, $R_3$ and $R_4$ are radicals selected from the group consisting of hydrocarbon radicals having less than 16 carbon atoms, which contain a linkage selected from the group consisting of ether linkage and ester linkage and halogenated hydrocarbon radicals having less than 16 carbon atoms, $R_5$ is a hydrocarbon radical selected from the group consisting of saturated and unsaturated aliphatic hydrocarbon radicals having 2 to 10 carbon atoms, $R_6$ and $R_7$ are radicals selected from the group consisting of hydrogen atom, alkyl group and alkoxy group having less than 5 carbon atoms, nitro group and halogen atom, $R_8$, $R_9$, $R_{10}$ and $R_{11}$ are radicals selected from the group consisting of hydrogen atom, alkoxy group having less than 3 carbon atoms and halogen atom and $n$ is an integer of 1 to 10 and 1 to 35% by weight of a low molecular weight epoxy compound having more than two epoxy groups per molecule, a molecular weight of less than 3,000 and an epoxy equivalent weight of less than 500, as composition in mixture ratio of solid contents, mole ratio of resorcinol to formaldehyde in said resorcinol formaldehyde resin being adjusted within the range of from 1:0.2 to 1:7 and the concentration of the total solid contents being 1 to 40% by weight.

References Cited

UNITED STATES PATENTS

| | | | |
|---|---|---|---|
| 2,682,559 | 6/1954 | Stanley | 260—45.95 |
| 2,902,398 | 9/1959 | Schroeder. | |
| 3,068,121 | 12/1962 | Weschler | 260—29.3 |
| 3,190,764 | 6/1965 | Cardina | 156—335 |
| 3,234,067 | 2/1966 | Krysiak | 156—335 |
| 3,330,794 | 7/1967 | Gallagher | 260—29.3 |
| 3,437,122 | 4/1969 | Van Gills | 260—29.3 |

JOHN C. BLEUTGE, Primary Examiner

U.S. Cl. X.R.

152—330; 156—330, 334, 335; 161—184, 231, 257; 260—3, 29.3, 30.6, 31.2, 31.6, 31.8, 32.2, 32.4, 32.8, 33.4, 33.6, 33.8, 831, 836, 837, 845, 846, 887